Nov. 17, 1953     W. O. THOMPSON     2,659,200
METHOD AND APPARATUS FOR SAFEGUARDING
AGAINST PROLONGED CESSATION OF
OPERATION OF TURBOJET ENGINES
Filed Aug. 18, 1950
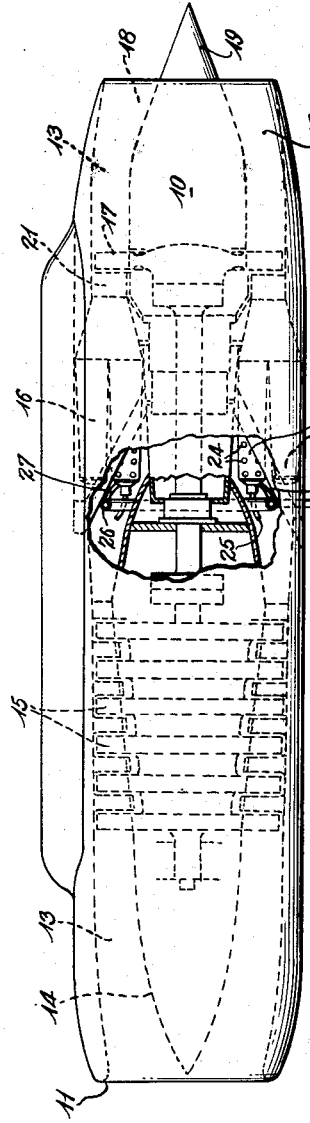
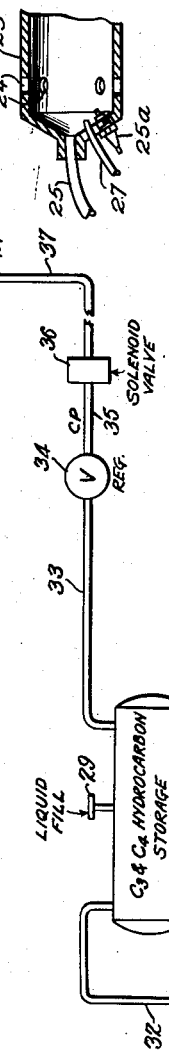
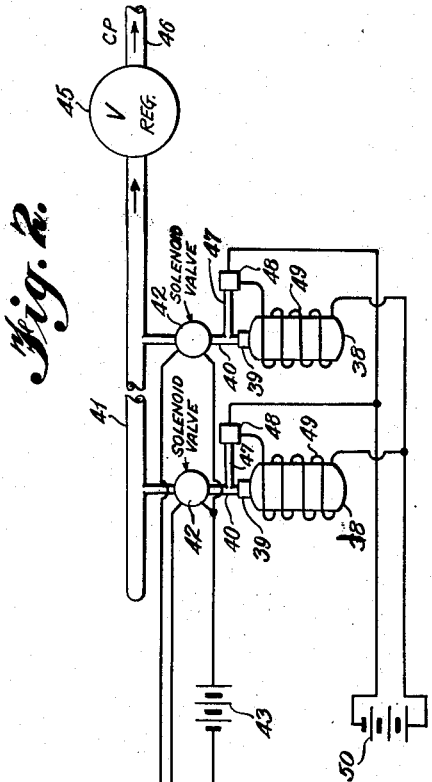
INVENTOR Patented Nov. 17, 1953

2,659,200

UNITED STATES PATENT OFFICE 2,659,200

METHOD AND APPARATUS FOR SAFEGUARDING AGAINST PROLONGED CESSATION OF OPERATION OF TURBOJET ENGINES

William O. Thompson, San Francisco, Calif.

Application August 18, 1950, Serial No. 181,492

9 Claims. (Cl. 60—39.06)

The present invention relates to a method and apparatus for safeguarding against prolonged cessation of operation of turbo-jet engines occasioned by loss of flame in the combustion chamber thereof.

A critical problem in the operation of turbo-jet engines and more especially on aircraft resides in the cessation of operation of the engine occasioned by loss of flame in the combustion chamber of the engine which brings about consequent deceleration of the turbine loss of altitude of the aircraft and all together too frequently results in a crash of the aircraft with attendant loss of life.

It is the purpose and object of the present invention to overcome the foregoing serious difficulties currently existing in turbo-jet engine operation.

More specifically, it is an object of the invention to provide a novel method and apparatus for supplying a pilot fuel in the form of a normally gaseous hydrocarbon having three to four carbon atoms per molecule to the combustion chamber of the engine at a point near the igniter for the jet fuel to be ignited in the combustion chamber and provide a pilot flame for the jet fuel supplied thereto.

The general mode of operation of the invention may be explained as follows:

The expression "flame-out" has reference to the loss of flame and consequently combustion of the normal supply of relatively high boiling jet fuel in the combustion chamber of the turbo-jet engine. When the loss of flame occurs the turbine decelerates from around ten to twelve thousand r. p. m. down to a few hundred r. p. m. in a matter of a very few seconds. The loss of flame may be occasioned by various causes. One very disastrous cause lies in the fact that jet plane pilots in seeking to slow down their speed of flight close the jet fuel throttle so rapidly that the tremendous supply of high pressure air from the compressor actually blows the flame out through the turbine. When this occurs re-ignition of the relatively high boiling jet fuel in the combustion chamber of the turbo-jet engine must be immediately effected otherwise the plane crashes. This is a crying problem in the actual operation of jet propelled aircraft today. In accordance with the present invention a pilot fuel readily ignitible by the electric spark of an ignitor in the environment prevailing in the combustion chamber of the turbo-jet engine is available either for constant or intermittent supply to the combustion chamber for the purpose of providing a pilot flame either for maintaining ignition and combustion of the normal supply of relatively high boiling jet fuel, or for supplying a pilot fuel to the combustion chamber of the jet engine to re-ignite the primary jet fuel when flame loss has occurred.

The pilot fuel supply is a liquefied gaseous hydrocarbon containing from three to four carbon atoms per molecule. Preferably, the pilot fuel is propane. However, it is within the purview of the invention to employ butane, as well as mixtures of propane and butane. When such mixtures are employed they preferably are comprised predominately of propane.

In the drawing, Figure 1 is a diagrammatic layout of one embodiment of the apparatus showing its association with a turbo-jet engine, and, Figure 2 is a diagrammatic layout of an alternative apparatus for supplying pilot fuel to the turbo-jet engine.

Figure 3 is a fragmentary longitudinal sectional view of one of the burner tubes.

The power plant shown in Figure 1 and generally indicated 10 is adapted to be mounted in or on the fuselage or wings of an airplane, with the left or intake end 11, as viewed in this figure, pointed in the direction of flight. The power plant comprises an outer shell or casing structure 12 providing an air duct 13 extending fore and aft with respect to the aircraft. This casing has mounted therein along its longitudinal axis, a nose portion 14 in which fuel and lubricating oil pumps and ignition apparatus may be supported, an axial flow compressor 15, combustion apparatus 16, a turbine 17, and a propulsion jet 18 defined by the casing 12 and a tailpiece 19 mounted concentrically therein. Air enters at the intake end 11, flows through the compressor 15 where it is compressed, and into the combustion apparatus where it is heated. The heated compressed air on leaving the combustion apparatus is directed by suitable guide vanes or nozzles 21 against the blades of the turbine rotor 17 and then discharged through the propulsion jet 18.

The combustion apparatus 16 may be of any suitable construction and is here shown as comprising a plurality of flared burner tubes 23 provided with openings 24 in the walls thereof through which the compressed air may enter the tubes and mix with fuel oil or the like supplied to the burners as by means of the pipes 25. A suitable ignition means such as a spark plug 25a may be provided for each burner.

As hereinbefore indicated, it is my purpose to supply a pilot fuel to the combustion zone of the turbo-jet engine. For this purpose there is disclosed in the embodiment of Figure 1 an annular header 26. Extending from the header 26 are a plurality of pilot fuel supply conduits 27 each leading to one of the burner tubes 23. The pilot fuel conduits 27 preferably discharge the pilot fuel into the chambers 23 closely adjacent the associated igniter which may take the form of a suitable spark plug 25a and at a point spaced somewhat from the point of introduction of the normal relatively high boiling jet fuel to the chambers 23. Figure 3 shows the points of introduction of the pilot fuel and normally high boiling jet fuel. By reference to Figure 3 it will be observed that the liquid fuel pipe 25 enters the burner tube 23 at a point spaced from the point of entry of the pilot fuel conduit 27 which is disposed adjacent the igniter 25a.

It will be observed that the annular header 26 is common to all of the chambers 23. The header 26 receives its supply of normally gaseous hydrocarbons, for example, propane, from the auxiliary pilot fuel supply chamber 28 having a liquid fill 29. The liquefied propane or other liquefiable normal gaseous hydrocarbon is maintained in the chamber 28 under the appropriate predetermined pressure which at all times will be greater than the operating pressure prevailing in the combustion chamber of the turbo-jet engine. The liquefied gaseous hydrocarbon passes from the bottom of chamber 28 through line 30 to a vaporizer 31 supplied with any suitable source of heat to effect the requisite vaporization at the prevailing pressure of the liquefied gaseous hydrocarbon. The vapors from the vaporizer 31 pass through line 32 and may re-enter tank 28 to maintain a constant supply of high pressure vaporous gaseous hydrocarbon available for delivery to the combustion chamber of the turbo-jet engine. These gaseous hydrocarbons pass from the chamber 28 through line 33 to an appropriate pressure regulator 34 which delivers the gaseous hydrocarbon at a constant pressure to the line 35 which is controlled by the solenoid valve 36, which, when open, permits the gaseous hydrocarbon at a predetermined constant pressure to be delivered through the line 37 to the annular header 26 and then via conduits 27 to the chambers 23.

Where a continuous pilot flame in the combustion chamber is desired the solenoid valve 36 may be maintained open throughout the operation of the turbo-jet engine. In this case there is a continuous supply of the gaseous hydrocarbon to the combustion chamber of the turbo-jet engine. It is, however, practical and expedient to conserve the consumption of the gaseous hydrocarbon (preferably propane) by merely admitting the gaseous hydrocarbon to the combustion chamber of the turbo-jet engine on those occasions when flame-out has occurred and re-ignition of the primary jet fuel is required. To accomplish this result the circuit for the solenoid valve 36 is under the control of the pilot or other operator through appropriate push button mechanism (not shown). In this way when the pilot or other operator of the turbo-jet engine first appreciates that flame-out has occurred he is able to open the valve 36 and permit the flow of gaseous hydrocarbons to the combustion chamber of the engine where such gases, such as propane, readily ignite in the presence of the excess air coming from the compressor and provide a direct flame for re-igniting the primary jet fuel.

In Figure 2 an alternative embodiment for the controlled intermittent supply of the gaseous hydrocarbons to the combustion zone of the turbo-jet engine is disclosed. In this alternative embodiment a bank of any desired number of pre-charge cartridges 38 containing liquefied gaseous hydrocarbons are provided. The cartridges 38 are replaceable so that when one or more of the cartridges 38 have been discharged they may be removed from the permanent parts of the installation and charged cartridges substituted. To facilitate this replacement an appropriate screw-type connection 39 is provided for each cartridge 38. It will be understood that the arrangement is such that when a charged cartridge 38 is placed in the system it will be vented into the system through the action of the screw-type connecting collar 39. From each chamber 38 an individual conduit 40 connects to a common header 41. In each conduit 40 there is disposed a suitable solenoid valve 42, and each valve 42 is disposed in a circuit individual to that valve. The battery 43 supplies the electrical source for these parallel circuits which are individually closable through the medium of the switches 44 which may take the form of hold-type push buttons mounted on a panel. The arrangement is such that when any given switch 44 is closed the push button thereof remains in depressed position indicating that the cartridge 38 associated with that particular depressed push button switch has then discharged.

The header 41 leads to the pressure regulator 45 which acts to reduce the pressure on the gaseous hydrocarbons from that pressure maintained in the header 41 to a constant lower pressure which prevails in the line 46 leading from the pressure regulator 45, and which may be connected to the annular header 26 as disclosed in Figure 1. The pressure in the line 46 will at all times, when gaseous hydrocarbons are being supplied to the combustion zone of the turbo-jet engine, be greater than the pressure prevailing in the said combustion zone.

Gaseous hydrocarbons are maintained under the requisite predetermined high pressure in the respective cartridges 38 through the controlled supply of heat to the individual cartridges. To accomplish this purpose the outlet of each cartridge 38 on the upstream side of the associated solenoid valve 42 leads through a line 47 to a pressure-actuated electric switch as indicated at 48. The switch 48 associated with any given cartridge 38 is adapted to close when the pressure in that cartridge falls below the predetermined minimum. The closing of the switch 48 establishes the flow of current through the associated heater coil 49 with resultant limited vaporization of liquefied gaseous hydrocarbon in that cartridge. When the required predetermined pressure in the cartridge has been restored the associated switch 48 opens. The source of current for the heater coils 49 in this embodiment is the battery 50. It will be appreciated that any appropriate source of electrical energy may be employed in lieu of either one or both of the batteries 43 and 50. Likewise, other appropriately controlled sources of heat may be substituted in maintaining the required predetermined pressure in the several cartridges 38.

The embodiment of Figure 2 has certain advantages in that the gaseous hydrocarbon charge for each cartridge is predetermined to effectively provide the requisite pilot fuel for a re-ignition of the primary jet fuel when a flame-out occurs.

In this embodiment once a given cartridge is cut into the system through opening of its associated solenoid valve, no further action on the part of the operator is required, and only the charge of that individual cartridge is exhausted leaving the other cartridges available for subsequent use. Additionally, the exhausted cartridges can be replaced by merely substituting charged cartridges for discharged ones. This avoids the necessity for high pressure charging of supply tanks such as is required in servicing the system of the embodiment disclosed in Figure 1.

The foregoing description has been given by way of exemplification of the invention, and is not to be construed as in limitation thereof, the scope of the invention being that set forth in the appended claims.

Having thus described my invention, what I claim is:

1. The method which comprises reestablishing combustion of a normally liquid fuel in a turbojet engine of a turbojet engine powered aircraft in flight, which combustion has been interrupted during the flight of said aircraft, by providing at a first point in a combustion chamber of said turbojet engine a pilot flame effective to ignite said normally liquid fuel separately introduced at a second point into said combustion chamber, said pilot flame being supported by a normally gaseous hydrocarbon having from 3 to 4 carbon atoms per molecule, said hydrocarbon being supplied in vapor form, at a pressure at least equal to that in said combustion chamber directly to said first point substantially concurrently with, but independently of, the supply of normally liquid fuel to said second point.

2. The method of claim 1 wherein the normally gaseous hydrocarbon is propane.

3. The method of claim 1 wherein the normally gaseous hydrocarbon is butane.

4. The method which comprises providing, at a first point in a combustion chamber of a turbojet engine mounted in an aircraft, a pilot flame effective to maintain combustion of a normally liquid fuel separately introduced at a second point into said combustion chamber; said pilot flame being supported by a normally gaseous hydrocarbon having from 3 to 4 carbon atoms per molecule, said hydrocarbon being supplied in vapor form, at a pressure at least equal to that in said combustion chamber, directly to said first point substantially concurrently with, but independently of, the supply of normally liquid fuel to said second point.

5. The method of claim 4 wherein the normally gaseous hydrocarbon is propane.

6. The method of claim 4 wherein the normally gaseous hydrocarbon is butane.

7. The method of claim 4 wherein the normally gaseous hydrocarbon is continuously supplied to the combustion chamber.

8. The method of claim 7 wherein the normally gaseous hydrocarbon is propane.

9. An apparatus comprising a turbojet engine mounted in an aircraft, a mechanical air-compressor in said engine, a combustion chamber in said engine, means for independently supplying normally liquid fuel and air from said compressor to said combustion chamber, a pressure vessel for containing a normally gaseous hydrocarbon in liquid form, means for separately supplying said hydrocarbon in vapor form from said vessel to said combustion chamber at a point spaced from the point of supply of said liquid fuel to said combustion chamber and at a pressure at least equal to the pressure prevailing in said combustion chamber, and means for igniting and maintaining independent combustion of said hydrocarbon in said combustion chamber to provide a pilot flame effective to ignite said liquid fuel.

WILLIAM O. THOMPSON.

References Cited in the file of this patent

UNITED STATES PATENTS

| Number | Name | Date |
| --- | --- | --- |
| 1,625,630 | Scott | Apr. 19, 1927 |
| 2,418,566 | Arnhym | Apr. 8, 1947 |
| 2,474,685 | McCollum | June 28, 1949 |
| 2,506,611 | Neal et al. | May 9, 1950 |
| 2,540,642 | Allen et al. | Feb. 6, 1951 |
| 2,542,953 | Williams | Feb. 20, 1951 |